H. A. LUGRIN.

STOP-WATCHES.

No. 7,172. Reissued June 13, 1876.

WITNESSES:

C. Neveux

John Goethals

INVENTOR:

H. A. Lugrin

BY Munn & Co

ATTORNEYS.

N. PETERS, PHOTO-LITHOGRAPHER, WASHINGTON, D. C.

UNITED STATES PATENT OFFICE.

HENRI A. LUGRIN, OF NEW YORK, N. Y.

IMPROVEMENT IN STOP-WATCHES.

Specification forming part of Letters Patent No. 176,231, dated April 18, 1876; reissue No. 7,172, dated June 13, 1876; application filed May 22, 1876.

*To all whom it may concern:*

Be it known that I, HENRI A. LUGRIN, of the city, county, and State of New York, have invented a new and Improved Timing-Watch, of which the following is a specification:

My invention consists of the quarter-second hand and its dial, located on the top of the watch-movement instead of the face, as heretofore, whereby the hand can be geared with less complication of machinery than when located on the other side, and the hand and dial are removed from the other dial and hands, so as to prevent confusion.

My invention also consists of the hand geared with the second-wheel of the watch-train by only two wheels, instead of three, as heretofore, and fitted on the post by a friction device, whereby it can be stopped and shifted back to the starting-point without stopping the wheel which drives it, which is a simpler and cheaper arrangement than that in which the hand is rigidly attached to the post, and a third wheel is employed, as, in this arrangement, gearing and ungearing the hand with the train is dispensed with.

My invention also consists of a minute-hand located on the same side of the movement, and at one side of the center-post, so as not to interfere with the quarter-second, in combination with a short section of a dial, to be used, if necessary, for counting minutes.

My invention also consists of the adjusting-lever for shifting the quarter-second back to the starting-point, also arranged for shifting the minute-hand back at the same time.

Figure 1:
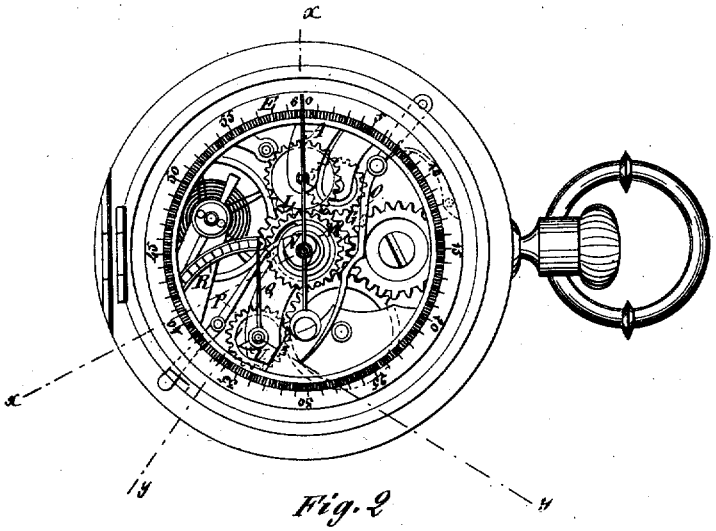
Figure 2:
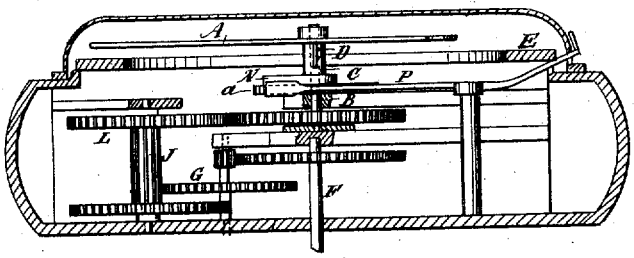
Figure 3:
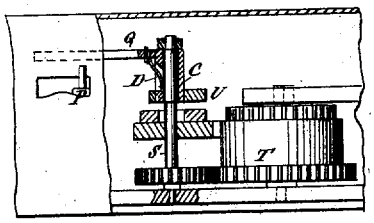

Figure 1 is a plan view of the top of a watch-movement having my improved arrangement of timing apparatus. Fig. 2 is a section on line *x x* of Fig. 1. Fig. 3 is a section on line *y y*.

Similar letters of reference indicate corresponding parts.

A is the quarter-second hand, mounted on the short center-post B, by the tube C and friction-spring D; and E is the dial for the same. They, A and E, are located on the top of the movement, the hour and minute hands being located, on the other side, on the short post F. The post which carries the hand is geared with the second-wheel G of the regular watch-train by the pinion J and wheels L M, which is a simpler train than is required when arranged in the ordinary way, in which the hand is rigidly attached to the post, and a third wheel is employed on a shifting-lever to gear and ungear it with its driving-wheel for starting and stopping the hands.

I am enabled to dispense with this extra wheel by making the stop-lever P act on a friction-wheel, *a*, attached to the tube C, by which the hand is fitted on the post B, and which is held thereon for being carried around by the post by the friction-spring D.

The operation of the watch is also better with this arrangement, because the hand always starts directly ahead when released by the lever, whereas, in throwing in the wheel the teeth sometimes so strike together that the hand is first thrown back a little. The usual heart-shaped cam N and lever O are employed for returning the hand A to the starting-point; also, the stop-lever P. Q is the minute-hand, which, with a sectional dial, R, I propose to locate at one side of the quarter-second hand, as shown. The hand Q is connected with a post, S, which gears with the barrel-wheel T, for being turned thereby, and I use a tube, C, and friction-spring D, the same as are employed for connecting the hand A.

A simple and efficient connection is thus formed, which is capable of carrying the hands properly, and also of allowing the posts to turn when the hands are stopped without obstructing the watch-movement.

The hand Q has a cam, U, for returning it to the starting-point, and the lever O is extended beyond the point V, which acts on the heart-cam, and is so arranged, relatively to the two posts, that it returns both hands to the starting-points at the same time.

In this example the hand A is made to beat fifths of seconds, but is designated by the more common term "quarter-seconds," for convenience.

Having thus described my invention, I claim as new and desire to secure by Letters Patent—

1. The quarter-second hand and its dial, located on the top of the watch-movement, substantially as specified.

2. The minute-hand Q and sectional dial R, located on the top of the watch-movement, and relatively arranged with the quarter-second hand, substantially as specified.

3. The quarter-second hand, mounted on the short center-post B, and geared with the second-wheel G of the watch-train, substantially as specified.

4. The combination, in a stop-watch, of a second-hand attached by friction devices to a post which is geared with the train, as herein described, and a friction stop-lever and friction-wheel, substantially as specified.

5. The adjusting-lever O, arranged in relation to the quarter-second and minute hands, whereby it adjusts both at the same time, substantially as specified.

6. The hand A, connected to the post B by tube C and spring D, substantially as specified.

HENRI ALFRED LUGRIN.

Witnesses:
T. B. MOSHER,
ALEX. F. ROBERTS.